Figure 1:
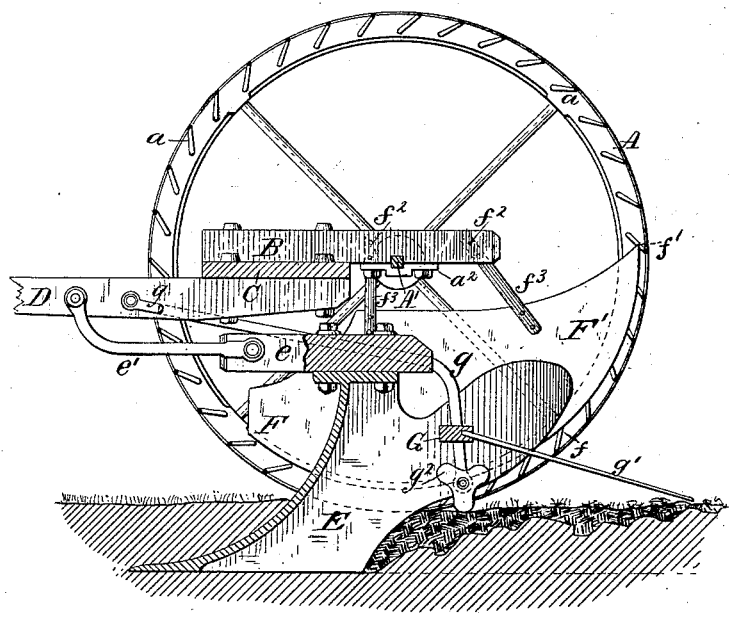

(No Model.)

F. M. THORN.
POTATO DIGGER.

No. 327,357. Patented Sept. 29, 1885.

Frank M. Thorn, Inventor.

Witnesses

UNITED STATES PATENT OFFICE.

FRANK M. THORN, OF ORCHARD PARK, NEW YORK.

POTATO-DIGGER.

SPECIFICATION forming part of Letters Patent No. 327,357, dated September 29, 1885.

Application filed December 15, 1883. (No model.)

*To all whom it may concern:*

Be it known that I, FRANK M. THORN, a citizen of the United States, residing at Orchard Park, in the county of Erie and State of New York, have invented certain new and useful Improvements in Potato-Digging Machines, of which the following is a specification.

My invention relates to potato digging by horse or other power. Heretofore the chief obstacle to the satisfactory operation of horse or other power potato-diggers has been their inability to elevate the potatoes, soil, &c., from the hills or rows to a sufficient height to render feasible their thorough sifting and separation.

The object of my invention is to provide a simple and effective method of removing all the potatoes and loose materials from the hills or rows, elevating them to any height required for their satisfactory sifting, partially or entirely sifting them during the process of elevating, and then depositing them upon any form of rotary, vibrating, or reciprocating sifter or separator, or upon the ground, if further sifting is unnecessary. This I accomplish by the employment of a vertically-adjustable double mold-board plow (*i. e.*, a plow with a right-hand mold-board and left-hand mold-board) between two broad-tread wheels, (*i. e.*, wheels with horizontally-broad rims,) the axis of each wheel being fixed to the frame to which the plow is attached in such a manner that as the machine advances half the contents of the potato hills or row will be turned or conveyed by each mold-board into the broad rim of the adjacent wheel, which in its revolution will elevate such contents until they are removed by a combined shield and carrier, and deposited, by gravity, upon a sifter or separator, or upon the ground behind the plow.

The broad tread or rim of each wheel is composed of a system or series of metallic rods of uniform length, made fast to the felly of the wheel, projecting inward toward the mold-board and at a distance of from one to two inches from each other, extending serially around the wheel.

The shield and carrier—for the prevention of clogging by the falling of potato-tops, &c., into the wheel-spokes, and for removing the potatoes and loose materials from the wheel-rim or system of rods—consists of an inflexible sheet or plate of smooth iron or other metal made fast to the frame-work by bars and bolts or screws, and so hung that the lower edge thereof along its whole extent nearly touches the concave plane of the wheel-rim or system of rods, and so adjusted that such edge of the shield and carrier will extend close to and parallel with the felly near the ground from a point nearly opposite the plow-point to a point nearly opposite the rear end of the mold-board, and thence diagonally or spirally upward to the opposite edge of the wheel-rim or system of rods, permitting the free revolution of the wheel, but intercepting any loose materials on the wheel-rim, carrying them off the inner edge thereof (being the inner ends of the system of rods) and letting them drop upon the sifter or separator, or upon the ground behind the plow and between the wheels.

Each wheel is provided with a shield and carrier.

The wheels serve not only as bearing-wheels to sustain the frame of the machine and as elevators, but their broad rims—composed of a system of rods, as aforesaid, fastened at their outer ends to the fellies, and with their inner ends free—serve as sifters of the loose materials turned upon them by the plow.

The rods are so attached to the felly of each wheel that where the latter touches the ground a slight space between the ground and the nearest rods will remain for the reception of sifted débris, and they are adjusted at such an angle to the felly that when the wheels revolve the rods upon the rear portion, and especially the rear lower quarter, of each wheel shall incline downward from the plane of the felly to facilitate the removal of tubers and loose materials from the rods, which object is further promoted by flaring the rods so that they are slightly farther apart at their free ends than at their fixed ends at the felly.

As the machine advances, the plow traverses the center of the potato-row, each mold-board turning half the row completely bottom upward into the adjacent wheel-rim, so that what before was the center of the row containing the potatoes is deposited over in the wheel-rim near the shield and carrier, leaving most of the soil nearer the inner edge of the wheel-rim, (or free ends of the rods,) from which position it will drop or be pushed off by the carrier first, thus leaving the portion containing most of the potatoes to drop or be pushed off last.

The wheels may be from three to seven feet, or other convenient diameter.

The separator (represented in the drawings as a system of inclined rods vibrated vertically by a cam-roller following the plow) may be of any other form, and may be operated vertically or horizontally by gearing.

Figure 3:
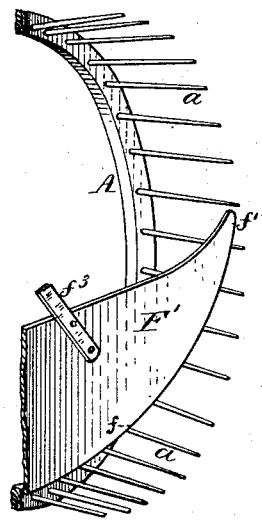
Figure 2:
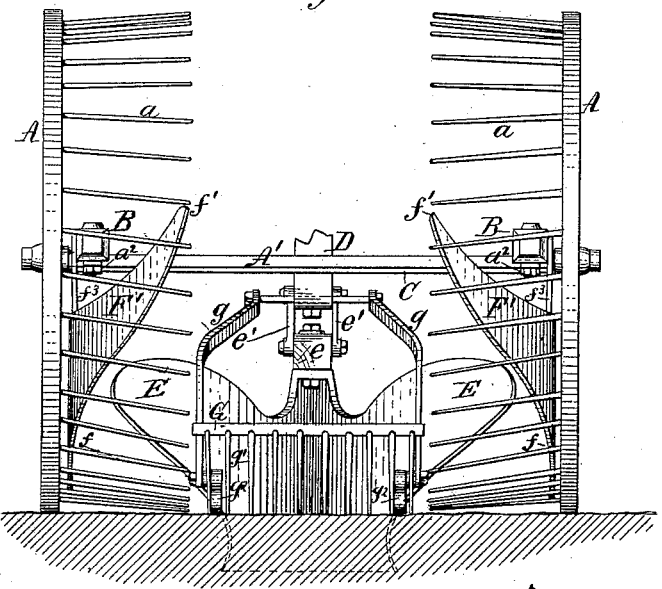
Figure 4:
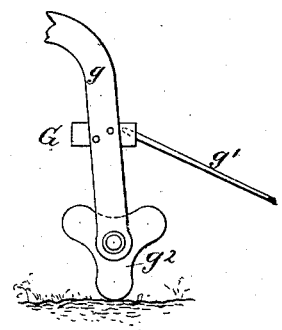

In the accompanying drawings, in which similar letters of reference indicate like parts, Figure 1 is a vertical section showing substantially one half of the machine embodying my invention, being the half remotest from the spectator. Fig. 2 is a rear elevation of the machine, showing the position of the mold-boards, wheels, combined shield and carrier, and separator relatively to each other. Fig. 3 is a perspective of a fragment or the rear part of the right-hand wheel and combined shield and carrier, and Fig. 4 is a side elevation of the separator and cam-roller.

A represents the felly, and $a$ the system of rods, so attached to the felly as to constitute a broad wheel-rim, the axle A' of the wheel being fixed to the frame-work B, which is bolted to the cross-piece C, to which is attached the pole D, by which the machine is drawn.

The wheels run along each side of the potato hills or rows, and as the machine advances each mold-board of the double mold-board plow E (which is attached to the machine by the beam $e$ and the bars $e'$) turns half the contents of the potato-row into the wheel-rim (or system of rods $a$) on that side, by which they are conveyed back and elevated until the combined shield and carrier F F' (which has thus far prevented their falling into the wheel-spokes) now pushes or carries them off the inner edge of the wheel-rim (being the inner or free ends of the system of rods $a$) and permits them to drop upon the separator G $g'$ back of the plow and between the wheels. The loose materials, while being conveyed back and elevated by the wheel-rim rods $a$, are also more or less thoroughly sifted before being dropped upon the separator operated by the cam-rollers $g^2$.

The combined shield and carrier F F', attached to the frame B by inflexible bars $f^3$ and bolts or screws $f^2$, extends nearly to the rim-rods $a$, and its lower edge, closely following the concave plane of the wheel-rim, (being the concave plane of the system of rods $a$,) extends close to and parallel with the felly A, from F to $f$, and thence extends diagonally or spirally upward, still following the concave plane of the rim-rods $a$, from $f$, near the felly, to $f'$ at the inner edge of the wheel-rim or system of rods $a$.

In the drawings the driver's seat and the device for raising and lowering the plow are omitted, so as to simplify the illustration of my invention.

Obviously the shield and carrier may be adjustable, so as to remove the loose materials from the wheel-rim at various heights, as varying soils or conditions may require.

I am aware that prior to my invention machines have been made for the turning or conveying of potatoes, soil, &c., and from a plow or share into one end or side of a hollow wheel or cylinder of rods, and their delivery from the other end or side thereof. I therefore do not claim, broadly, the combination of a plow or share with a hollow wheel or cylinder.

I do not claim, broadly, the employment in connection with a plow of wheels having rods or fingers projecting inwardly from their rims, but

What I claim as my invention, and desire to secure by Letters Patent, is—

1. In combination with the separating-wheel having the rods $a$, the combined shield and carrier F F', constructed substantially as described, and adapted to prevent the potato-tops from falling into the wheel-spokes and to remove the potatoes, soil, and other loose material from the wheel rim or rods at any desired height from the ground, as specified.

2. The combination of the separating-wheels having rods $a$, the combined shield and carrier, arranged as specified, and the double plow having its mold-boards curved spirally, substantially as shown and described, whereby the soil and potatoes elevated by the plow are not only turned laterally into the wheel-rim but also inverted, so that the center of the row which contains most of the potatoes is thrown toward the outside of said wheel-rims and next to the shield and carrier, leaving most of the soil nearer the inner edge of the wheel-rims so that it will be first pushed off by the carrier, as specified.

FRANK M. THORN.

Witnesses:
H. E. HAMBLETON,
CHRISTOPHER HAMBLETON.